United States Patent [19]

Annis

[11] 4,241,201

[45] Dec. 23, 1980

[54] PHENOLIC RESINS WITH IMPROVED LOW TEMPERATURE PROCESSING STABILITY

[75] Inventor: Myron C. Annis, North Tonawanda, N.Y.

[73] Assignee: Hooker Chemicals & Plastics Corp., Niagara Falls, N.Y.

[21] Appl. No.: 30,038

[22] Filed: Apr. 13, 1979

Related U.S. Application Data

[63] Continuation-in-part of Ser. No. 915,335, Jun. 13, 1978.

[51] Int. Cl.$^3$ .................. C08G 8/20; C08G 8/24; C08G 8/28
[52] U.S. Cl. .................. 525/503; 260/38; 264/328.2; 528/127; 528/137; 528/143; 528/153; 528/155
[58] Field of Search ............... 528/127, 153, 155, 128; 525/503

[56] References Cited

U.S. PATENT DOCUMENTS

| 2,854,415 | 9/1958 | De Groote | 528/153 |
| 3,959,433 | 5/1976 | Sauers | 264/328 |

FOREIGN PATENT DOCUMENTS

| 484657 | 7/1952 | Canada | 528/153 |
| 950291 | 2/1964 | United Kingdom . | |

Primary Examiner—Wilbert J. Briggs, Sr.
Attorney, Agent, or Firm—Peter F. Casella; James F. Mudd

[57] ABSTRACT

Phenolic novolak resins are described which are structurally characterized as having from about 55% to about 90% of the available theoretical paraphenyl linkages in the resin chain bridged to a phenyl group. The resin compositions of this invention provide extended resin stability at relatively low temperatures without significant adverse affect on the cure speed at the molding temperature. The resins are especially suited for use in runnerless injection or cold manifold molding processes, but can also be used in transfer, compression and injection molding processes.

15 Claims, No Drawings

PHENOLIC RESINS WITH IMPROVED LOW TEMPERATURE PROCESSING STABILITY

REFERENCE TO PRIOR APPLICATION

This is a continuation-in-part of application Ser. No. 915,335, filed June 13, 1978.

BACKGROUND OF THE INVENTION

For many years, thermosetting phenolic resins have been molded using standardized compression or transfer molding techniques. While these techniques generally provide molded articles having excellent dimensional stability and good physical properties, technical improvements leading to cost reduction and increased productivity are required in order to enable thermosetting phenolics to remain competitive with other plastics and materials of constructions such as metals and ceramics. One such improvement has been the application of injection molding techniques to fabricate parts from thermosetting phenolic molding compositions. The injection molding process offers the advantages of reduced molding cycles, better control of process variables, and increased productivity as compared with conventional compression and transfer molding processes. The major disadvantage with the injection molding of thermosetting materials lies in the inevitable generation of a considerable amount of scrap, particularly when employing multiple cavity systems. This scrap represents thermosetting material that has cured (become infusible) in the runner and cannot be reused. The amount of non-reusable scrap generated in this fashion can be substantial, typically ranging anywhere from 15% to 80% of the total amount of material required to mold a part.

A more recent technical advance in the molding art has been the adaptation of the runnerless injection, or cold manifold, process to injection mold thermosetting phenolics. In the cold manifold process, the material in the sprue and manifold system (the so-called "runner") is maintained at a sufficient temperature to plasticize the material, without causing it to cure or "set-up" prematurely. Thus, when a cured part is removed from the mold cavity, the material in the sprue and manifold becomes part of the next molding, instead of being discarded as in conventional injection and transfer molding operations, the runnerless injection process, therefore, provides for significant savings in material, and, in addition, increased industrial efficiency by the elimination of secondary operations such as extra finishing and secondary gate grinding.

The thermosetting materials employed in runnerless injection processes differ, in certain respects, from materials normally employed in conventional injection processes due to the different requirements of each process. One significant difference is that a standard injection or transfer molding material typically has a stiffer plasticity for faster molding cycles. In contrast, a runnerless injection material should remain in a plasticized or fused condition in the manifold or barrel of the mold for extended periods of time without curing prematurely at the manifold temperature, i.e. usually about 125° C., while being capable of curing rapidly in the mold cavity at the molding temperature, i.e. usually about 170° C. In addition, the molded part should also have good dimensional stability and physical properties.

The prior art discloses various thermosetting compositions which are directed to runnerless injection applications. For instance, U.S. Pat. No. 3,959,433, to Sauers, discloses the addition of non-polymeric para-substituted phenols, such as Bisphenol-A, to a thermosetting phenolic resin in order to reduce the viscosity of the resin in the manifold, i.e. to improve its processibility. This composition is limited in terms of the range of monomer or dimer employed, generally being less than 35 parts by weight based on 100 parts by weight of resin, since introducing higher concentrations in the resin composition tends to adversely affect the physical properties of a molded article by decreasing the cross-linking density of the cured article. Moreover, this composition has not been found to be effective in significantly improving the processing stability of the resin at the manifold temperature. As this is a critical parameter in any runnerless injection molding process, it will readily be apparent that a continuing need exists for improved runnerless injection materials, and, in particular, for improved materials having enhanced processing stability.

While the phenolic resins of this invention are primarily useful in runnerless injection processes, where low temperature processing stability is a critical factor, they also find utility in more conventional molding processes such as injection molding, extrusion, and transfer molding processes where material savings can also be a significant factor.

SUMMARY OF THE INVENTION

Accordingly, this invention provides phenolic novolak resins with improved thermal stability which are structurally characterized as having from about 55% to about 90% of the available theoretical paraphenyl linkages in the resin chain bridged to a phenyl group. Suitable resins may be prepared in situ by sequentially reacting excess phenol with a ketone, in the presence of a mineral acid catalyst to form a bisphenol, and subsequently reacting the products (phenol+bisphenol) with an aldehyde to form the resin. Suitable resins can also be prepared by the reaction of bisphenol, phenol and an aldehyde. Alternatively, suitable novolak resins having a predominance of the available theoretical para-phenyl linkages in the resin chain bridged to a phenyl group can be prepared by admixing (1) a novolak resin prepared by condensing excess phenol with an aldehyde with (2) from about 10 to about 80 parts by weight of admixture of a novolak resin prepared by condensing excess bisphenol, preferably Bisphenol-A, with an aldehyde. The resin compositions of this invention have significantly enhanced processing stability at the manifold temperature of a runnerless injection molding apparatus.

DESCRIPTION OF THE PREFERRED EMBODIMENTS

The phenolic novolak resins of this invention are prepared from components well-known to those skilled in the plastics art. These resins may be prepared by a variety of methods. However, regardless of the method of preparation employed, the resin system is characterized as having a predominance, or at least about 55%, preferably at least about 65%, but less than about 90%, and preferably less than about 80%, of the available theoretical para-phenyl linkages in the resin chain bridged to a phenyl group. It will be readily appreciated that the remaining unoccupied para-phenyl positions of such resins are available for cross-linking reaction. The resin compositions of this invention have excellent thermal stability at the process temperature of a runnerless injection manifold, i.e. about 125° C. Rather surprisingly, it has been found that resin systems having less than about 55% of the available theoretical para-phenyl linkages bridged do not, in general, experience a significant improvement in low temperature (125° C.) processing stability. Resin systems having greater than about 90% of the available theoretical para-phenyl linkages bridged have not been found satisfactory due to excessively slow curing speeds at the molding temperature (170° C.).

The introduction of the required predominance, i.e. between about 55% and 90%, of the available theoretical para-phenyl linkages into the resin composition is generally accomplished by introducing a p-p' bisphenolic structure into the resin composition. In one method (A), the bisphenolic structure can be introduced into a reaction mixture of a phenol and an aldehyde and/or ketone as a separate component. In another method (B), the bisphenol can be formed in situ by the reaction of a ketone, and preferably acetone, with the phenol, preferably phenol per se. As a typical example of the in situ method of preparation, a bisphenol A structure can be introduced into a phenolic resin by reacting phenol and acetone, in a molar ratio of about 4:1 respectively, at about 0° C. to about 20° C. employing a hydrochloric acid catalyst. After removing any excess phenol, an aldehyde is added to the reaction mixture and reacted at reflux temperature to form a novolak resin having a predominance of the available theoretical para-phenyl linkages of the resin bridged to a phenyl group.

The resins of the invention which are prepared by either of the afore-mentioned methods (A) or (B), differ from prior art resins in several respects. First, the resins are characterized by having short carbon chains linked between adjacent hydroxyl-substituted phenyl nuclei. These carbon chains are generally 1 to 5 carbon atoms in length, preferably 1 to 4 carbon atoms and more preferably 1 to 3 carbon atoms.

The resins are further characterized by having phenolic groups, i.e., hydroxyl-substituted phenyl nuclei that are capable of forming a three-dimensional network. Thus, each hydroxyl-substituted phenyl nucleus is capable of chain growth at unsubstituted ortho- and para-positions of those nuclei.

The result of employing resins having the foregoing chemical characteristics is to increase the cross-linking density of the resins to improve the thermal properties such as heat distortion temperature and the mechanical properties such as tensile and flexural strength.

The phenols which are suitable for use in this invention include phenol per se (unsubstituted), and substituted phenols which are unsubstituted in the para position, wherein at least about half the substituted phenols have at least two of the ortho and para positions of the phenol nucleus available for condensation (unsubstituted). Such phenols may be characterized by the following general formula:

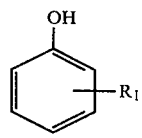

where $R_1$ can be hydrogen, fluorine, chlorine, bromine or a suitable substituent selected from the following:

a. Alkyl and alkenyl groups of 1 to 18 carbon atoms in any of their isomeric forms and substituted on the phenolic nucleus in the ortho or meta positions;

b. Alicyclic groups of 5 to 18 carbon atoms such as cyclohexyl, cyclopentyl, methyl cyclohexyl, butyl cyclohexyl, and the like;

c. Aromatic or aralkyl groups of 6 to 18 carbon atoms such as phenyl, alpha-methyl benzyl, benzyl, cumyl and the like;

d. Alkyl, alkenyl, alicyclic, aryl and aralkyl ketones wherein the hydrocarbon is defined as hereinbefore;

e. Alkyl, alkenyl, alicyclic, aryl and aralkyl carboxylic groups wherein the hydrocarbon is defined as hereinbefore, and mixtures thereof.

As indicated, the hydrocarbon radicals preferably have from 1 to 18 carbon atoms.

Suitable substituted phenols include meta-cresol, ortho-cresol, ortho-chlorophenol, ortho-ethylphenol, meta-butylphenol, ortho-butylphenol, and the like, as well as mixtures thereof.

The preferred phenols are unsubstituted and have both ortho and para positions available for condensation reaction.

The bisphenols which can be used in this invention are p,p'-substituted bisphenols and include compounds corresponding to the general formula:

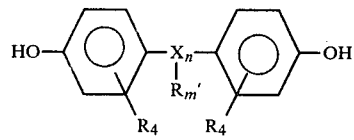

wherein the $R_4$ substituents are located in meta positions with respect to the individual phenyl nuclei and correspond to the $R_4$ substituents of the substituted phenols described above; R' is hydrogen, alkyl, haloalkyl, aryl, haloaryl, alkylaryl, haloalkylaryl, arylalkyl, haloarylalkyl, cycloalkyl, halocycloalkyl or heterocyclic; X is a divalent (or di-substituted) alkylene, cycloalkylene, arylene, —O—, —S—, —SO—, —SO$_2$—, —SO$_3$—, —CO—, R'P<=O, or R'N<; m is an integer from 0 to the number of replaceable hydrogen atoms on X; and n is 0 or 1. When there is more than one R' substituent in the bisphenol, such substituents may be the same or different. Preferred embodiments include configurations wherein X is a single divalent carbon atom or a sulfur atom, and m is 2, wherein at least one of the R' substituents is hydrogen and the other R' substituent is methyl, isopropyl, or phenyl. A particularly preferred embodiment is Bisphenol A, wherein X is a single divalent carbon atom, m is 2 and both R' substituents are methyl groups. Mixtures of the above-described bisphenols may also be employed.

Examples of bisphenols which may be used in practicing this invention include 2,2-bis(4-hydroxyphenyl)-propane (bisphenol A), 2,2-bis(4-hydroxyphenyl)methane, 2,2-bis(3-methyl-4-hydroxyphenyl)methane, 2,2-bis(4-hydroxy-3,5-dichlorophenyl)methane, 2,2-bis(4-hydroxyphenyl)sulfide, 2,2-bis(4-hydroxyphenyl)oxide, 2,2-bis(4-hydroxyphenyl)ketone, 2,2-bis(4-hydroxyphenyl)sulfone, 2,2-bis(4-hydroxyphenyl)sulfoxide, 2,2-bis(4-hydroxyphenyl)sulfonate, 2,2-bis(4-hydroxyphenyl)amine, 2,2-bis(4-hydroxyphenyl)phenyl phosphine oxide, para-phenylphenol, para-benzylphenol, as well as mixtures thereof, including commercially available mixtures such as mixtures of isomers, mixed isomer by-product streams, and the like.

The aldehydes or ketones or mixtures thereof which can be employed are those which are capable of reacting with a phenol or bisphenol, provided the aldehydes or ketones do not contain a functional group or structure which is detrimental to the condensation reaction. The preferred aldehyde is formaldehyde, which can be in aqueous solution or in any of its low polymeric forms such as paraform or trioxane or gaseous, anhydrous formaldehyde. The aldehydes preferably contain 1 to 8 carbon atoms. Other examples include acetaldehyde, propionaldehyde, butyraldehyde, benzaldehyde, furfural, 2-ethyl-hexanal, ethylhexanal, ethylbutyraldehyde, heptaldehyde, pentaerythrose, glyoxal, chloral, mesityl oxide, and the like. The ketones have the formula:

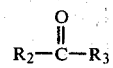

wherein $R_2$ and $R_3$ can be hydrogen or organic radicals. Examples of ketones are acetone, methyl ethyl ketone, diethyl ketone, methyl benzyl ketone, methyl cyclohexyl ketone, diallyl ketone, dichloromethyl ketone, as well as mixtures thereof. $R_2$ and $R_3$ preferably have 1 to 7 carbon atoms. The preferred ketone is acetone.

The proportion of theoretical para-phenyl linkages in the final condensation product can be controlled by varying the proportion of bisphenol present in the reactive mixture of phenol and an aldehyde and/or ketone. As is known to those skilled in the art, novolak resins formed by the condensation reaction of an unsubstituted phenol monomer and an aldehyde and/or a ketone generally have approximately 50% of the available theoretical para-phenyl linkages bridged to a phenyl group in the resin chain. By replacing the unsubstituted phenol with a bisphenol in the reaction mixture, the resulting condensation product has all of the available theoretical para-phenyl linkages in the resin chain as p-p' bridges. However, as mentioned previously, a resin having such a high proportion of available theoretical para-phenyl linkages which are bridged would not be suitable for use in this invention due to extremely slow cure speed in the mold. Accordingly, an effective amount of bisphenol needed to provide the required proportion of para-phenyl linkages has been found to be in the range of from about 0.1 to about 0.8 moles per mole of total phenolic component employed in the condensation reaction.

The ratio of aldehyde or ketone to phenol can be varied to prepare condensates of various molecular weights, and the viscosity of the final condensation product can be regulated by the molecular weight of the phenol-aldehyde or phenol-ketone condensate. A low molecular weight condensation product is generally preferred. Generally, the amount of aldehyde or ketone varies from 0.5 to 0.9 mole per mole of phenol, and is preferably in the range of about 0.63 to about 0.68, and most preferably is about 0.65 to 0.67 mole per mole of phenol.

In an especially preferred embodiment, the phenolic resins of this invention are prepared by admixing (1) a novolak resin component prepared by condensing excess phenol and an aldehyde, and (2) a novolak resin component prepared by condensing a bisphenol, preferably bisphenol-A, with an aldehyde. The blend or intimate mixture of the components can be prepared using conventional mixing equipment, such as, for example, a Banbury mixer, ball mill, or kneader. The proportion of each resin component required to prepare a composition having a predominance of available theoretical paraphenyl linkages can vary from about 10 to about 80 parts by weight of resin component (2) per 100 parts by weight of resin blend. Preferably according to this method of preparation, the resin component (2) is present in an amount of from about 20 to about 60 parts per 100 parts by weight of resin blend, and most preferably from about 30 to 60 parts by weight.

The preferred resins of the invention are characterized as having a narrow molecular weight distribution as measured by gel permeation chromotography (GPC) and expressed as Heterogeneity Index (HI), which is the ratio of weight average molecular weight ($\overline{M}w$) to number average molecular weight ($\overline{M}n$). The most preferred resins of the invention have a Heterogeneity Index in the range of about 1.5 to 2. The weight average molecular weight ($\overline{M}w$) is generally in the range of 600 to 1000, and the number average molecular weight ($\overline{M}n$) is generally in the range of about 350 to 450. These resins have a low melt viscosity which is generally in the range of about 500 to 1200 centipoises at 135° C.

In addition to these most preferred resins, other resins which can be used in the compositions of the invention have the following characteristics:

| | RESIN | | |
|---|---|---|---|
| | A | B | C |
| Characteristics | | | |
| Gel Permeation Chromatography (GPC) | | | |
| $\overline{M}w$ | 800–1000 | 1000–1400 | 1200–1600 |
| $\overline{M}n$ | 350–450 | 350–450 | 350–450 |
| Heterogeneity Index (H.I.) | 2.1–2.5 | 2.5–3.1 | 2.7–3.2 |
| Melt Viscosity @ 135° (centipoises) | 1500–2500 | 2500–4000 | 3000–4000 |

The phenolic resin compositions of this invention can be compounded with various additives and adjuvants, such as curing accelerators, metal oxides such as lime, ZnO, MgO and mixtures thereof; fillers such as glass fiber, wood flour, clay, talc, and the like, stabilizers, plasticizers, curing accelerators, antistatic agents, and lubricants such as stearic acid and glycerol monostearate.

The novolak resins of this invention are prepared with a deficiency of aldehyde, preferably in the presence of an acid catalyst such as strong mineral or organic acids such as sulfuric acid and oxalic acid, and will only cure or cross-link in the presence of a curing amount of a suitable aldehyde donor compound. In commercial practice, the aldehyde donor commonly employed is hexamethylenetetramine which is blended in finely divided form with the pulverized resin. Upon the addition of a curing amount of hexamethylenetetramine (or some other suitable aldehyde donor), the resin becomes thermosetting and will permanently fuse upon heating.

The resin, fillers, cross-linking agents, and other ingredients can be thoroughly blended by ball-milling and fused by roll-milling, extrusion or other conventional techniques. After it is fused, the molding composition can be tested by curing in a Brabender Plasticorder (ASTM designation D-1898), an instrument which continuously measures the torque exerted in shearing a polymer, and the time interval to the onset of cure of the resin at a particular temperature can be measured to determine the barrel life and the molding cycle.

Prolonging the barrel life of the resin may result in a somewhat longer molding cycle as compared to conventional resin systems due to a slower cure speed at the molding temperature. The molding cycle may be shortened by the adjustment of certain operating variables, such as by increasing the molding temperature, or by employing a resin composition having a lower proportion of available theoretical para-phenyl linkages.

The following examples further illustrate the various aspects of the invention but are not intended to limit it. For instance, in accordance with known practice, the molding composition may also include additional appropriate ingredients including pigments, lubricants, mold release agents and the like. Where not otherwise specified in this specification and claims, temperatures are given in degrees centigrade, and all parts and percentages are by weight.

PREPARATION OF NOVOLAK RESIN USING AN UNSUBSTITUTED PHENOL MONOMER

Example 1

A phenol-formaldehyde novolak resin was prepared by reacting 0.66 moles of formaldehyde per mole of phenol utilizing 0.25 parts of a sulfuric acid catalyst based on 100 parts of charged phenol. The mixture was subsequently neutralized, dehydrated to melt, dumped, and allowed to solidify. The resulting resin has the following properties within the stated ranges:

| Gel Permeation Chromatography (GPC) | |
|---|---|
| $\overline{M}w$ | 600–1000 |
| $\overline{M}w$ | 350–450 |
| Heterogeneity Index (H.I.) | 1.5–2.0 |
| Melt Viscosity @ 135° C. (centipoises) | 500–1200 |

100 Parts of the solid novolak product was then ground to a fine particle size and milled with about 21 parts of hexamethylenetetramine, 2 parts of glycerol monostearate, 1 part stearic acid, and 1 part of zinc stearate.

PREPARATION OF NOVOLAK RESIN USING BISPHENOL-A

Example 2

A bisphenol-formaldehyde novolak resin was prepared by reacting 0.66 moles of formaldehyde per mole of Bisphenol A utilizing 0.25 parts of a sulfuric acid catalyst based on 100 parts of charged Bisphenol A. The mixture was subsequently neutralized, dehydrated to melt, dumped, and allowed to solidify. The resulting resin has the following properties within the stated ranges:

| Gel Permeation Chromatography (GPC) | |
|---|---|
| $\overline{M}w$ | 600–1000 |
| $\overline{M}w$ | 350–450 |
| Heterogeneity Index (H.I.) | 1.5–2.0 |
| Melt Viscosity @ 135° C. (centipoises) | 500–1200 |

100 Parts of the solid resin product was then ground to a fine particle size and milled with about 21 parts of hexamethylenetetramine, 2 parts of glycerol monostearate, 1 part stearic acid, and 1 part of zinc stearate.

PREPARATION OF PHENOLIC MOLDING COMPOUNDS

Example 3

80 Parts of the resin of Example 1 and 20 parts of the resin of Example 2 were mixed with 34.6 parts of 60 mesh wood flour, 16.3 parts of 100 mesh wood flour, 7.7 parts of bark wood flour, 5.8 parts of diatomaceous earth, 13.5 parts of clay, 7.7 parts of lime, and 1.5 parts of black dye. The compound was ball-milled for 1 hour, roll-milled at 70° C. (front roll) and 90° C. (back roll), and ground thru a ¼" screen. A blending wax was added and the resulting molding compound was analyzed using a Brabender Plasticorder. The results are set forth below in Table 1.

Example 4

A phenolic molding compound was prepared following the procedure of Example 3 using 60 parts of the resin of Example 1 and 40 parts of the resin of Example 2. The results are set forth in Table 1.

Example 5

Following the procedure of Example 3, a phenolic molding compound was prepared using 40 parts of the resin of Example 1 and 60 parts of the resin of Example 2. The results are set forth in Table 1.

PREPARATION OF NOVOLAK RESIN - IN SITU METHODS

Example 6

3000 Parts of phenol and 900 parts of Bisphenol A were charged to a reaction kettle and heated to 65° C.–75° C. A solution of 2106 parts of formalin (45%) and 9.8 parts of sulfuric acid was added dropwise as rapidly as possible to bring the mixture to reflux. The mixture was held at reflux temperature until less than about 1% free formaldehyde remained. A solution of 7.4 parts of lime and 20 parts of water was then added to neutralize the acid content of the system. The mixture was vacuum stripped to prepare a brittle base resin. The base resin can then be compounded with hexamethylenetetramine, glycerol monostearate, stearic acid, and zinc stearate, such as in Example 1, to prepare a molding compound.

Example 7

1500 Parts of phenol was charged to a reaction kettle and mixed with a solution of 1500 parts of acetone, 11.7 parts of pyridine, and 15 parts of HCl, which was added dropwise until dissolved. The mixture was brought to reflux and held at reflux temperature until the free formaldehyde content was less than about 1%. The mixture was then dehydrated to prepare a base resin which can be compounded with various ingredients as in Example 6 to prepare a molding compound.

PREPARATION OF PHENOLIC MOLDING COMPOUNDS

Example 8

A typical formulation was prepared by employing a resin blend comprising approximately 70% of an unsubstituted phenol-formaldehyde novolak resin, such as prepared in Example 1, and about 30% of a bisphenol-formaldehyde novolak resin, such as prepared in Example 2. Various fillers and adjuvants were added to the resin blend to produce a commercial grade runnerless injection molding material.

Control Example 1

Following the procedure of Example 3, a control was prepared using 100 parts of the resin of Example 1. The results are set forth in Table 1.

Control Example 2

Following the procedure of Example 3, a control was prepared using 100 parts of the resin of Example 2. The results are set forth in Table 1.

Comparative Example 1

Following the procedure of Example 3, a phenolic molding compound was prepared using 90 parts of the resin of Example 1 and 10 parts of a Bisphenol A monomer. The results are set forth in Table 1.

Comparative Example 2

Following the procedure of Example 3, a phenolic molding compound was prepared using 80 parts of the resin of Example 1 and 20 parts of a Bisphenol A monomer. The results are set forth in Table 1.

Similarly, the composition of Examples 4 and 5 correspond to a novolak resin having 70% of available theoretical para-phenyl linkages bridged, and 80% of the available theoretical para-phenyl linkages bridged, respectively, calculated as follows:

```
   60 parts Ex. 1 resin × 50% para linkages
+  40 parts Ex. 2 resin × 100% para linkages
= 100 parts Ex. 4 resin × 70% para linkages.
```

```
   40 parts Ex. 1 resin × 50% para linkages
+  60 parts Ex. 2 resin × 100% para linkages
= 100 parts Ex. 5 resin × 80% para linkages.
```

The Cure Time data in Table 1 demonstrates that the compositions of Examples 3, 4 and 5 exhibit significantly improved resin processing stability at 125° C. as compared to the compositions of Control Example 1, and Comparative Examples 1 and 2 which employ a Bisphenol A monomer. The composition of Control Example 2, while exhibiting excellent stability at 125° C., has a molding cycle which is unacceptably long for typical commercial applications.

PREPARATION OF RESINS BY IN SITU

TABLE 1

| EXAMPLE | 125° C. ANALYSIS | | | | 170° C. ANALYSIS | | | |
|---|---|---|---|---|---|---|---|---|
| | MINIMUM TORQUE (m-g) | FLOW DURATION (mm) | PEAK TORQUE (m-g) | CURE TIME (min.) | MINIMUM TORQUE (m-g) | FLOW DURATION (mm) | PEAK TORQUE (m-g) | CURE TIME (min.) |
| Example 3 | 300 | 223 | 2300 | 9.8 | 110 | 22 | 1350 | 1.4 |
| Example 4 | 350 | 260 | 2350 | 10.8 | 110 | 27 | 1575 | 1.6 |
| Example 5 | 325 | 338 | 2745 | 11.3 | 110 | 34 | 1690 | 1.9 |
| Control Example 1 | 275 | 163 | 2300 | 8.1 | 110 | 24 | 1125 | 1.4 |
| Control Example 2 | 200 | 318 | 3175 | 17.9 | 100 | 34 | 2550 | 2.7 |
| Comparative Example 1 | 275 | 183 | 2375 | 8.4 | 110 | 33 | 1225 | 1.5 |
| Comparative Example 2 | 200 | 177 | 2400 | 8.7 | 90 | 31 | 1200 | 1.5 |

The data in Table 1 demonstrates the significant improvement in resin stability at the manifold temperature, i.e. 125° C., achieved by the compositions of this invention as compared to conventional resin systems. By way of explanation, the Minimum Torque measurement denotes the minimum viscosity at the indicated temperature, recorded before the onset of cure of the resin. The Flow Duration is a measure of the time to onset of cure of the resin, measured in millimeters of flow. The Peak Torque is a measure of the strength or rigidity of the composition under peak loading conditions.

The composition of Example 3 comprises a resin blend of 80 parts by weight of a conventional phenol-formaldehyde novolak resin and 20 parts by weight of a bisphenol-formaldehyde novolak resin. Since the conventional novolak has approximately 50% of the available theoretical para-phenyl linkages bridged, while the bisphenol resin has all of the available theoretical para-phenyl linkages bridged, the resulting resin blend corresponds to a novolak resin having about 60% of the available theoretical para-phenyl linkages bridged. This can be calculated as follows:

```
   80 parts Ex. 1 resin × 50% para linkages
+  20 parts Ex. 2 resin × 100% para linkages
= 100 parts Ex. 3 resin × 60% para linkages.
```

METHOD AND PHENOLIC MOLDING COMPOUNDS PREPARED THEREFROM

Example 9

3600 Parts of phenol, 400 parts of bisphenol-A, 350 parts of Ashland 10 TF solvent which is a mixture of about 47% aliphatic petroleum naphthas, 17% toluene and 36% isobutylacetate, and 10 parts of sulfuric acid were charged to a reaction kettle equipped with a Dean Stark trap and sub-surface feed line. The reactants were mixed and heated to 105°–110° C. Then, 1600 parts of 50 percent aqueous formaldehyde were introduced through the sub-surface feed line at a rate to maintain the temperature at 105°–110° C. The top layer in the trap was returned to the kettle. The reaction was continued at 105°–110° C. for one hour after the formaldehyde addition. The reaction mixture was neutralized slowly with a slurry of 6.5 parts magnesium oxide and 30 parts of water, and mixing was continued for 5 minutes. The reaction mixture was vacuum stripped until it had a brittle point of 63°–70° C. clear. 4000 parts of product were discharged from the reactor, tested and had the following properties:

| Gel Permeation Chromatography (GPC) | |
|---|---|
| $\overline{M}w$ | 587 |
| $\overline{M}n$ | 340 |
| Heterogeneity Index (H.I.) | 1.73 |

| -continued | |
|---|---|
| Melt Viscosity @ 135° C. (centipoises) | 387 |

2500 Parts of the resin were compounded with 525 parts of hexamethylenetetramine (hexa), 50 parts of glycerol monostearate, 25 parts of stearic acid and 25 parts of zinc stearate. Then 1300 parts of the resulting compound was mixed with 450 parts of 60 mesh wood flour, 212 parts of 40 mesh wood flour, 100 parts of bark wood flour, 75 parts of diatomaceous earth, 175 parts of clay, 100 parts of magnesium oxide, and 20 parts of black dye. The resulting compound was ball milled for one hour, roll milled at 70° C. (front roll) and 90° C. (back roll) and ground through a ¼ inch screen. A blending wax was added and the resulting molding compound was analyzed using a Brabender plasticorder. The results are shown in Table 3.

Examples 10–14

The processes of Example 9 were repeated using the same proportions and conditions except as shown in Table 2. Resin characteristics are also shown in Table 2.

TABLE 2

| | EXAMPLE NO. | | | | |
|---|---|---|---|---|---|
| | 10 | 11 | 12 | 13 | 14 |
| Phenol | 3200 | 2400 | 1200 | 800 | 400 |
| Bisphenol-A | 800 | 1200 | 2800 | 3200 | 3600 |
| 50% Formaldehyde | 1500 | 1300 | 800 | 800 | 800 |
| Magnesium Oxide | 6.5 | 6.5 | 6 | 6 | 6 |
| Water | 30 | 30 | 25 | 25 | 25 |
| Yield of Resin | 4000 | 4250 | 3985 | 4085 | 4250 |
| Initial Heating Temperature | 105–110 | 105–110 | 110–115 | 110–115 | 110–115 |
| GPC: $\overline{M}w$ | 643 | 694 | 463 | 478 | 606 |
| $\overline{M}n$ | 342 | 360 | 297 | 303 | 353 |
| H.I. | 1.88 | 1.93 | 1.56 | 1.58 | 1.72 |
| Melt Viscosity @ 135° C. (centipoises) | 650 | 625 | 200 | 437 | 950 |

In Examples 12, 13 and 14, the final compound was prepared by mixing 390 parts of the hexa-resin compound of the respective Example with 910 parts of a hexa-resin compound made with a phenolic novolak such as prepared in Example 1.

The top layer in the trap was returned to the kettle. The reaction was continued at 110°–115° C. for two hours after addition of the isobutyraldehyde. The reaction mixture was neutralized slowly with a slurry of 15 parts of lime and 45 parts of water. Thereafter, the reaction mixture was vacuum stripped until it had a brittle point of 63°–70° C. clear. 4890 Parts of product were discharged from the reactor.

3000 Parts of the resin were compounded with 630 parts of hexamethylenetetramine (hexa), 30 parts of stearic acid, 30 parts of zinc stearate and 60 parts of glycerol monostearate.

Examples 16 and 17

The processes in Example 15 were repeated for Examples 16 and 17 using the same proportions and conditions except as shown in Table 4. Resin characteristics are also shown in Table 4.

TABLE 4

| | EXAMPLE NO. | | |
|---|---|---|---|
| | 15 | 16 | 17 |
| Phenol | 3200 | 2400 | 1600 |
| Bisphenol-A | 800 | 1600 | 2400 |
| Isobutyraldehyde | 1803 | 1563 | 1323 |
| Yield | 4890 | 4275 | 4435 |
| GPC: $\overline{M}w$ | 375 | 344 | 335 |
| $\overline{M}n$ | 280 | 276 | 269 |
| H.I. | 1.34 | 1.25 | 1.24 |
| Melt Viscosity (CP @ 135° C.) | 400 | 363 | 513 |

For each of the hexa-resin compounds of Examples 15, 16 and 17, three blends of the hexa-resin compounds of the respective Example was blended with the hexa-resin compound as produced in Example 1. These blends were prepared in the proportions shown in Table 5.

TABLE 5

| | SAMPLE CODE | | |
|---|---|---|---|
| | A | B | C |
| Resin of Example | 250 | 500 | 750 |
| Resin of Example 1 | 750 | 500 | 250 |

Each of the three blends for each of the three Examples (total of 9 blends) was compounded with 346 parts of 60 mesh wood flour, 163 parts of 40 mesh wood flour,

TABLE 3

| | 125° C. ANALYSIS | | | | 170° C. ANALYSIS | | | |
|---|---|---|---|---|---|---|---|---|
| EXAMPLE | MINIMUM TORQUE (m-g) | FLOW DURATION (mm) | PEAK TORQUE (m-g) | CURE TIME (min.) | MINIMUM TORQUE (m-g) | FLOW DURATION (mm) | PEAK TORQUE (m-g) | CURE TIME (min.) |
| 9 | 400 | 271 | 2250 | 10.0 | 125 | 23 | 1075 | 1.28 |
| 10 | 425 | 275 | 2150 | 10.3 | 125 | 24 | 1100 | 1.28 |
| 11 | 400 | 315 | 2500 | 12.28 | 125 | 25 | 1250 | 1.4 |
| 12 | 475 | 265 | 2500 | 9.95 | 110 | 22 | 1125 | 1.32 |
| 13 | 500 | 251 | 2500 | 9.55 | 125 | 22 | 1180 | 1.28 |
| 14 | 500 | 234 | 2500 | 8.98 | 125 | 21 | 1150 | 1.28 |

Example 15

3200 Parts of phenol, 800 parts of bisphenol-A, 1400 parts of toluene and 20 parts of sulfuric acid were charged to a reaction kettle equipped with a Dean Stark trap and a sub-surface feed line. The reactants were mixed and heated to 115° C. Then, 1803 parts of isobutyraldehyde were added through the sub-surface feed line at a rate to maintain the temperature at 110°–115° C.

77 parts of bark wood flour, 58 parts of diatomaceous earth, 135 parts of clay, 77 parts of lime and 15 parts of black dye. The resulting compound was ball-milled for one hour, roll-milled at 70° C. (front roll) and 90° C. (back roll) and ground through a ¼ inch screen. A blending wax was added and the resulting molding compound was analyzed using a Brabender plasticorder. The results are shown in Table 6.

TABLE 6

| | 125° C. ANALYSIS | | | | 170° C. ANALYSIS | | | |
|---|---|---|---|---|---|---|---|---|
| EXAMPLE | MINIMUM TORQUE (m-g) | FLOW DURATION (mm) | PEAK TORQUE (m-g) | CURE TIME (min.) | MINIMUM TORQUE (m-g) | FLOW DURATION (mm) | PEAK TORQUE (m-g) | CURE TIME (min). |
| 15 A | 350 | 364 | 475 | 13.5 | 125 | 23 | 1825 | 1.6 |
| 15 B | 300 | 552 | 720 | 20.2 | 100 | 29 | 2400 | 2.25 |
| 15 C | 200 | >1180 | | >29.5 | 85 | 52 | 3450 | 3.0 |
| 16 A | 400 | 414 | 520 | 14.8 | 115 | 29 | 1900 | 1.8 |
| 16 B | 300 | 612 | 815 | 23.1 | 100 | 40 | 2350 | 2.3 |
| 16 C | 225 | — | — | >30 | 65 | 50 | 3400 | 3.4 |
| 17 A | 345 | 419 | 550 | 14.7 | 110 | 28 | 1750 | 1.87 |
| 17 B | 300 | 650 | 680 | 23.0 | 100 | 44 | 2250 | 2.5 |
| 17 C | 225 | — | — | >30.0 | 75 | 59 | 2950 | 3'57" |

The foregoing embodiments are intended to illustrate the invention without limiting it thereby. Various modifications can be made in the invention without departing from the spirit and scope thereof.

I claim:

1. A phenolic novolak molding composition having improved low temperature processing stability comprising a phenol-aldehyde resin wherein (a) from about 55% to about 90% of the available theoretical para-phenyl linkages in the chain are bridged to a phenyl group, (b) the carbon chains linked between adjacent hydroxyl-substituted phenyl nuclei have 1 to 5 carbon atoms, and (c) the hydroxyl-substituted phenyl nuclei are capable of chain growth at unsubstituted ortho and para positions of said nuclei.

2. The molding composition of claim 1 wherein the aldehyde is formaldehyde.

3. The molding composition of claim 1 which is prepared in situ by the condensation reaction of an unsubstituted phenol, a bisphenol, and an aldehyde.

4. The molding composition of claim 1 which is prepared in situ by the sequential reaction of phenol, acetone and formaldehyde.

5. The composition of claim 3 wherein the bisphenol has the formula:

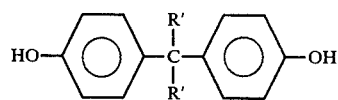

wherein each R' is independently selected from the group consisting of hydrogen, metyl, isopropyl, or phenyl.

6. The composition of claim 5 wherein the bisphenol is bisphenol-A.

7. The composition of claim 2 wherein the resin has a heterogeneity index in the range of about 1.5 to 2, and a melt viscosity in the range of about 500 to 1200 centipoises at 135° C.

8. The composition of claim 2 wherein the resin has a heterogeneity index in the range of about 2.1 to 2.5 and a melt viscosity in the range of about 1500 to 2500 centipoises at 135° C.

9. The composition of claim 2 wherein the resin has a heterogeneity index in the range of about 2.5 to 3.1 and a melt viscosity in the range of about 2500 to 4000 centipoises at 135° C.

10. The composition of claim 2 wherein the resin has a heterogeneity index in the range of about 2.7 to 3.2 and a melt viscosity in the range of about 3000 to 4000 centipoises at 135° C.

11. The composition of claim 3 or 4 which includes hexamethylene tetramine and a filler material.

12. A molding article formed by curing the composition of claim 1.

13. A molded article formed by curing the composition of claim 3.

14. A molded article formed by curing the composition of claim 4.

15. A molded article formed by curing the composition of claim 11.

* * * * *